(12) United States Patent
Shafer et al.

(10) Patent No.: US 8,499,544 B2
(45) Date of Patent: Aug. 6, 2013

(54) TURBOGENERATOR WITH COOLING SYSTEM

(75) Inventors: Douglas George Shafer, Cincinnati, OH (US); Mark Gerard Rettig, Taylor Mill, KY (US); Robert John VanderMolen, Peabody, MA (US)

(73) Assignee: General Electric Company, Schenectady, NY (US)

( * ) Notice: Subject to any disclaimer, the term of this patent is extended or adjusted under 35 U.S.C. 154(b) by 932 days.

(21) Appl. No.: 12/620,093

(22) Filed: Nov. 17, 2009

(65) Prior Publication Data
US 2011/0115227 A1    May 19, 2011

(51) Int. Cl.
F02K 99/00    (2009.01)
F02K 3/02    (2006.01)
F02K 1/38    (2006.01)

(52) U.S. Cl.
USPC .............................. 60/266; 60/226.1; 60/262

(58) Field of Classification Search
USPC .............. 60/266, 267, 226.1, 226.3, 262, 806
See application file for complete search history.

(56) References Cited

U.S. PATENT DOCUMENTS

| 4,791,783 A | 12/1988 | Neitzel |
| 5,259,187 A | 11/1993 | Dunbar et al. |
| 5,404,713 A * | 4/1995 | Johnson .......................... 60/204 |
| 7,216,475 B2 | 5/2007 | Johnson |
| 7,406,829 B2 | 8/2008 | Coffinberry |
| 8,387,362 B2 * | 3/2013 | Storage et al. .................. 60/266 |
| 2005/0235626 A1 * | 10/2005 | Hull et al. .................. 60/39.511 |
| 2007/0051233 A1 | 3/2007 | Duge |
| 2007/0104233 A1 | 5/2007 | Vetrovec |
| 2008/0143115 A1 | 6/2008 | Kern et al. |
| 2008/0150287 A1 | 6/2008 | Kern et al. |
| 2008/0314573 A1 | 12/2008 | Schwarz et al. |
| 2009/0188232 A1 | 7/2009 | Suciu et al. |

(Continued)

FOREIGN PATENT DOCUMENTS

| EP | 1 947 311 A2 | 7/2008 |
| WO | WO 02/38938 A1 | 5/2002 |

OTHER PUBLICATIONS

"Dynamic and Transient Performance of Turbofan/Turboshaft Convertible Engine With Variable Inlet Guide Vanes", Jack G McArdle, Richard L. Barth, Leon M. Wenzel, and Thomas J. Biesiadny, NASA Technical Memorandum 4696, Apr. 1996.

*Primary Examiner* — Ehud Gartenberg
*Assistant Examiner* — William Breazeal
(74) *Attorney, Agent, or Firm* — General Electric Company; William Scott Andes; Matthew P. Hayden

(57) ABSTRACT

A turbogenerator having a gas turbine engine powering generator and a cooling system and an annular heat exchanger powered by a fan disposed across an outer fan duct of the engine. Fan variable inlet and outlet guide vanes may be used to vary power between the fan and the generator which are drivenly connected to a low pressure turbine. Inner and outer portions separated by a rotating shroud of the fan are disposed in annular inner and outer fan ducts respectively. A directed energy weapon may be powered by the generator and cooled by the cooling system. A refrigeration apparatus may be operably disposed between the annular heat exchanger and the directed energy weapon for cooling the directed energy weapon and conditioning power electronics for the weapon. The refrigeration apparatus may include a vapor cycle cooling system and a cold storage containing a phase change material.

31 Claims, 1 Drawing Sheet

U.S. PATENT DOCUMENTS

2009/0188234 A1 7/2009 Suciu et al.
2009/0260781 A1 10/2009 Ullman et al.
2010/0074736 A1* 3/2010 Junod .......................... 415/178
2010/0251726 A1* 10/2010 Jones et al. ..................... 60/773

* cited by examiner

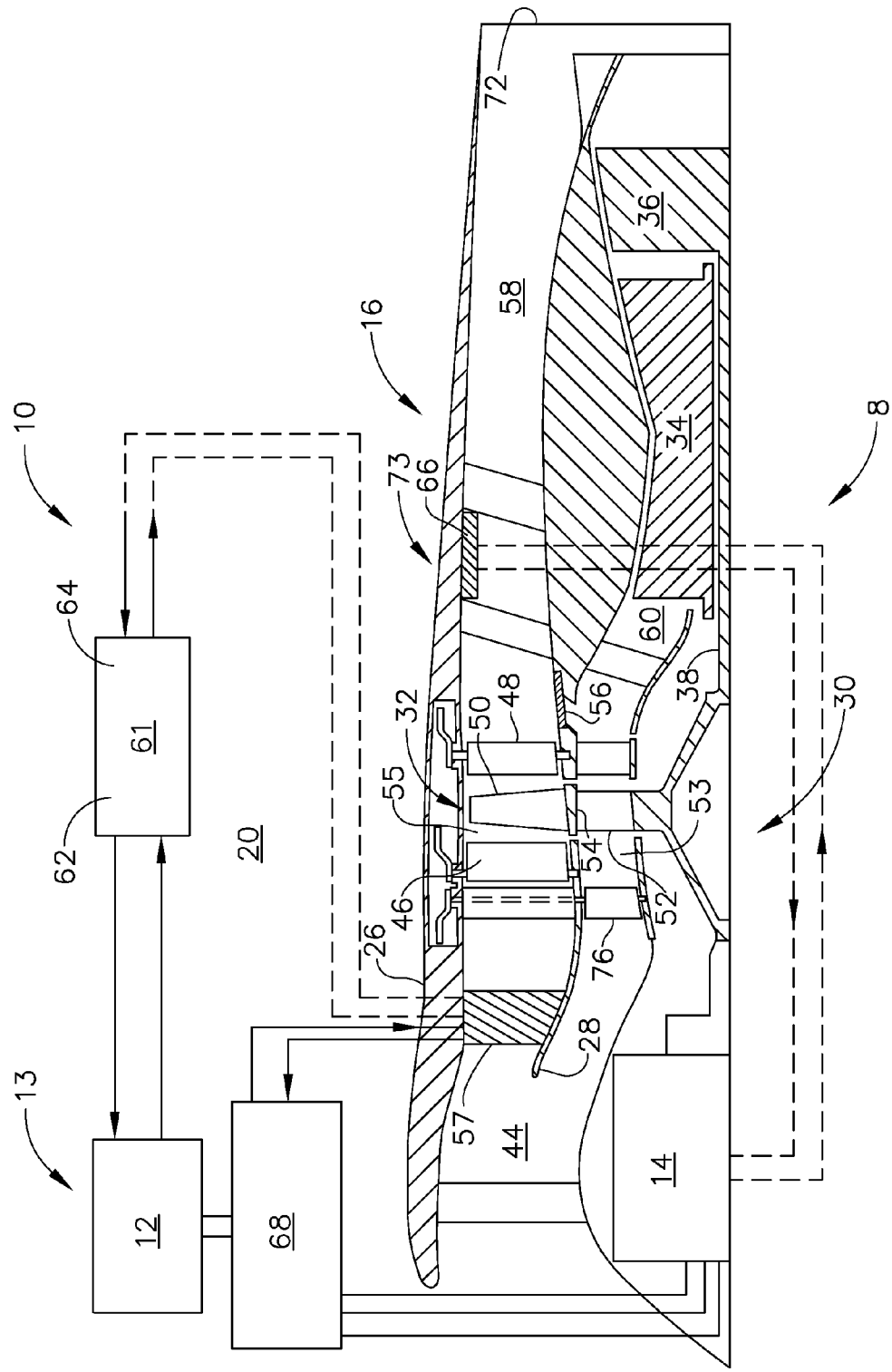

TURBOGENERATOR WITH COOLING SYSTEM

BACKGROUND OF THE INVENTION

1. Field of the Invention

The present invention relates to gas turbine engine powered generators or turbogenerators and cooling and thermal management systems.

2. Description of Related Art

Directed energy weapons (DEW) require megawatts (in a range of between 1-5 megawatts or more) of fast (e.g. less than 0.1 sec) on/off pulsing power. They also require megawatts of heat removal that can be provided by gas turbines driving electrical generators, also referred to as turbogenerators. Turbogenerators, such as independent APU power sources to meet the power requirement, can provide enough power but are slow (on the order of 4 sec). Batteries and complicated power electronics are often used to meet the transient power requirements. These systems typically require large RAM air heat exchangers for thermal management of the large heat loads generated by the DEW.

Directed energy weapons are representative of very high power devices in high energy systems that are being studied and developed for a variety of applications. One area of high energy systems under very active development is directed energy controlled effects, also referred to as Directed Energy Weapons (DEW). Sea based, ground, and DEW systems are being developed to provide missile defense as well as other defense related capabilities. DEW include microwave energy to disrupt enemy electronics, laser energy to damage or destroy targets and particle beam energy to damage or destroy targets.

It is highly desirable to provide a fast switching thermal management system within a single integrated turbogenerator package for high energy devices such as directed energy weapons using large amounts of electrical power in a range of between 1-5 megawatts or more.

SUMMARY OF THE INVENTION

A turbogenerator includes a gas turbine engine operable to power a generator, a cooling system including an annular heat exchanger disposed entirely across an annular outer fan duct of the gas turbine engine and powered by a fan in the gas turbine engine. Variable inlet guide vanes may be disposed within the outer fan duct just upstream of the fan and variable outlet guide vanes may be disposed within the outer fan duct just downstream of the fan. A low pressure turbine and the generator may be drivingly connected to the fan by a low pressure turbine shaft with a core engine operably disposed between the fan and the low pressure turbine.

Inner and outer portions of the fan separated by a rotating shroud may be disposed in the annular inner and outer fan ducts respectively upstream of the core engine. A surface heat exchanger may be disposed in a bypass duct extending axially and downstream from the outer fan duct. The surface heat exchanger may be operably connected to the generator for cooling the generator.

A high energy system including a power consuming device may incorporate the turbogenerator for powering the power consuming device and the cooling system for cooling the power consuming device. The cooling system may include a refrigeration apparatus operably disposed between the annular heat exchanger and the power consuming device for cooling the power consuming device and the refrigeration apparatus may include a vapor cycle cooling system and a cold storage containing a phase change material.

The high energy system may be a directed energy weapon system with the power consuming device being a directed energy weapon. Conditioning power electronics operably disposed between the generator and the directed energy weapon conditioning the electricity produced by the electrical generator and supplied to the directed energy weapon. The cooling system is operably connected to the directed energy weapon and the conditioning power electronics for cooling the directed energy weapon and the conditioning power electronics.

BRIEF DESCRIPTION OF THE DRAWINGS

The foregoing aspects and other features of the invention are explained in the following description, taken in connection with the accompanying drawings where:

FIG. 1 is a partially cross-sectional and schematic view illustration of an integrated gas turbine engine and generator for powering and cooling a directed energy weapon.

DETAILED DESCRIPTION OF THE INVENTION

FIG. 1 illustrates an exemplary high energy system 8 in the form of a directed energy weapon system 10 including a directed energy weapon 12 (DEW) powered by an electrical generator 14 in a turbogenerator 16. The turbogenerator 16 includes a gas turbine engine 30 operable to power the generator 14 and a cooling system 20 for cooling the directed energy weapon system 10. The directed energy weapon system 10 further includes conditioning power electronics 68 operably disposed between the generator 14 and the directed energy weapon 12 for conditioning the electricity produced by the electrical generator 14 for operating and firing the directed energy weapon 12. The gas turbine engine 30 is operable to switch between exclusively powering the generator 14 and exclusively powering the cooling system 20 or powering both simultaneously.

A fan 32 upstream of a core engine 34, also referred to as a gas generator, is drivenly connected to a low pressure turbine 36 that supplies power to the fan 32 through a low pressure turbine shaft 38 concentrically mounted with respect to the core engine 34. The core engine 34 is operably disposed between the fan 32 and the low pressure turbine 36 and is axially located downstream of the fan 32. The generator 14 is also drivenly connected to the low pressure turbine 36 by the low pressure turbine shaft 38.

The directed energy weapon system 10 including the directed energy weapon 12 and the conditioning power electronics 68 requires megawatts of fast (e.g. less than 0.1 sec) on/off pulsing power that is produced by the electrical generator 14. The directed energy weapon 12 and the conditioning power electronics 68 also require megawatts of heat removal which is provided by the cooling system 20. The turbogenerator and cooling system may be used to power and cool other types of large power consuming devices 13 besides directed energy weapons 12.

In order to provide for additional control of the engine's airflow and thereby help increase the engine's efficiency downstream of a fan inlet 44, the fan 32 is split into an outer portion 50 and inner portion 52. The inner and outer portions 52, 50 of the fan 32 are disposed in annular inner and outer fan ducts 53, 55 respectively and separated by a rotating shroud 54. The inner portion 52 supercharges the core engine 34 with a compressed airflow that is separated by the shroud 54 from being affected by the airflow past the outer portion 50. This separation allows core engine supercharging and inlet flow conditions to be relatively independent of the position of fan variable inlet guide vanes 46 disposed within the outer fan duct 55. An inner variable inlet guide vane 76 axially ahead and upstream of the inner portion 52 is provided to assist in matching the airflow characteristics of the inner portion 52 with the airflow requirements of the core engine 34.

The variable inlet guide vanes 46 are disposed within the outer fan duct 55 downstream of the fan inlet 44 and just upstream of the fan 32. The exemplary embodiment of the gas turbine engine 30 illustrated herein further includes variable outlet guide vanes 48 disposed within the outer fan duct 55 just downstream of the fan 32. The basic characteristics of variable inlet and outlet guide vanes 46, 48 are known to those skilled in the art, and it is known that vanes can be rotated to different positions to control the volume of inlet airflow into the fan 32. A bleed valve 56 is provided between an engine bypass duct 58 and a core engine inlet 60 to the core engine 34 radially located inwardly of the bypass duct 58. The bypass duct 58 extends axially and downstream from the outer fan duct 55 to an engine exhaust nozzle 72. By incorporating this bleed valve 56, an outlet is provided to permit redirection of excess air supercharged by the fan inner portion 52 when it is not required by the core engine 34. It is expected that bleeding of fan airflow would be required only at part power engine settings when fan speed is held at maximum levels.

The inlet guide vanes 46 are part span inlet guide vanes, meaning the vanes physically extend into the engine's bypass stream region only. The inlet guide vanes' 46 angular position will tend to affect the fan outer portion airflow only. The airflow that flows radially inwardly of the inlet guide vanes 46 is then relatively unaffected by vane position. The use of these part span inlet guide vanes 46 is useful for maintaining reasonable airflow conditions entering the core engine 34 over the entire range of inlet guide vane angles. The shroud 54 tends to further promote this airflow separation which generally increases the engine performance at inlet guide vane closures.

A fan powered DEW annular heat exchanger 57 is disposed entirely across the outer fan duct 55 upstream of the variable inlet guide vanes 46. The exemplary embodiment of the fan powered DEW annular heat exchanger 57 illustrated herein is annular and extends radially completely across the outer fan duct 55. The exemplary directed energy weapon system 10 illustrated herein further includes a vapor cycle cooling system 61 for cooling the directed energy weapon 12. The vapor cycle cooling system 61 is essentially a refrigeration apparatus 62 that may include a cold storage 64 containing a phase change material such as paraffin. The exemplary embodiment of the cooling system 20 illustrated herein further includes a surface heat exchanger 66 disposed in the bypass duct 58 downstream of the fan powered DEW annular heat exchanger 57. The surface heat exchanger 66 is operably connected to the generator 14 for cooling the generator. The surface heat exchanger 66 is disposed along or in a nacelle or radially outer wall circumscribing the bypass duct 58 and preferably downstream of the fan 32.

The VGVs allow switching between shaft horsepower to power the electrical generator 14 for the DEW and cooling flow for the DEW annular heat exchanger 57 used to cool the DEW. The directed energy weapon system 10 allows cycling between power and cooling flow at 100% of the gas turbine engine's speed and load. This eliminates a transient problem of ramping up the gas turbine engine 30 from a low to high power level in a very short period of time, typically, about 0.1 sec.

When the gas turbine engine 30 is operating to power the electrical generator 14 which in turn is powering the directed energy weapon 12 during firing of the directed energy weapon 12, the inlet guide vanes 46 can be rotated to a "closed" position to reduce the inlet airflow and, thereby, reduce the load on the fan 32 with the fan still rotating. This permits a majority of the mechanical power from the gas turbine engine 30 to be transferred to the generator 14 through the low pressure turbine shaft 38 instead of to the fan 32.

When the gas turbine engine 30 is not powering the electrical generator 14, the inlet guide vanes 46 are rotated to an "open" position increasing the inlet airflow and primarily cooling the directed energy weapon system 10 through the vapor cycle cooling system 61 and the cold storage 64 by cooling and solidifying the phase change material therein. The cold storage 64 is used as a heat sink to cool the electrical generator 14 during its operation when the electrical generator 14 is primarily powering the directed energy weapon 12.

This permits the gas turbine engine 30 to be constantly running at or near operating conditions for the firing of the directed energy weapon system 10. The power produced by the gas turbine engine 30 can very quickly be switched between shaft horsepower to power the electrical generator 14 for firing the DEW and the fan 32 to produce cooling flow for the DEW annular heat exchanger 57 used to cool and solidify the phase change material in the cold storage 64 making it available to be used as a heat sink to cool the electrical generator 14 during the operation and firing of the DEW.

The cooling system 20 and more particularly the fan powered DEW annular heat exchanger 57 is used for cooling the directed energy weapon system 10 and more particularly to cool the directed energy weapon 12 and the power electronics 68. The turbogenerator and cooling system 20 is useful for providing a fast switching thermal management system within a single integrated turbogenerator package for high energy devices such as directed energy weapons 12 using large amounts of electrical power in a range of between 1-5 megawatts or more.

The present invention has been described in an illustrative manner. It is to be understood that the terminology which has been used is intended to be in the nature of words of description rather than of limitation. While there have been described herein, what are considered to be preferred and exemplary embodiments of the present invention, other modifications of the invention shall be apparent to those skilled in the art from the teachings herein and, it is, therefore, desired to be secured in the appended claims all such modifications as fall within the true spirit and scope of the invention.

Accordingly, what is desired to be secured by Letters Patent of the United States is the invention as defined and differentiated in the following claims:

What is claimed is:

1. A turbogenerator comprising:
 a gas turbine engine operable to power a generator,
 a cooling system including an annular heat exchanger powered by a fan in the gas turbine engine,
 variable inlet guide vanes disposed within the outer fan duct just upstream of the fan, and
 the annular heat exchanger disposed entirely upstream of the variable inlet guide vanes and across an annular outer fan duct of the gas turbine engine.

2. A turbogenerator as claimed in claim 1, further comprising variable outlet guide vanes disposed within the outer fan duct just downstream of the fan.

3. The turbogenerator as claimed in claim 1, further comprising:
the gas turbine engine including a low pressure turbine drivingly connected to the fan and the generator,
a core engine operably disposed between the fan and the low pressure turbine,
a low pressure turbine shaft drivingly connected to the fan and the generator, and
variable inlet guide vanes disposed within the outer fan duct just upstream of the fan.

4. The turbogenerator as claimed in claim 3, further comprising:
inner and outer portions of the fan disposed in an annular inner fan duct and the outer fan duct respectively,
a rotating shroud separating inner and outer portions, and
the core engine downstream of the inner fan duct and the inner portion therein.

5. The turbogenerator as claimed in claim 4, further comprising variable outlet guide vanes disposed within the outer fan duct just downstream of the fan.

6. The turbogenerator as claimed in claim 4, further comprising a bypass duct extending axially and downstream from the outer fan duct and a surface heat exchanger disposed in the bypass duct.

7. The turbogenerator as claimed in claim 6, further comprising the surface heat exchanger operably connected to the generator for cooling the generator.

8. A high energy system comprising:
a power consuming device,
a turbogenerator including a gas turbine engine operably connected to a generator for powering the generator and operably connected to the power consuming device for powering the power consuming device,
a cooling system operably connected to the power consuming device for cooling the power consuming device,
the cooling system including an annular heat exchanger powered by a fan in the gas turbine engine,
variable inlet guide vanes disposed within the outer fan duct just upstream of the fan, and
the annular heat exchanger disposed entirely upstream of the variable inlet guide vanes and across an annular outer fan duct of the gas turbine engine.

9. A high energy system as claimed in claim 8, further comprising variable outlet guide vanes disposed within the outer fan duct just downstream of the fan.

10. The high energy system as claimed in claim 8, further comprising:
the gas turbine engine including a low pressure turbine drivingly connected to the fan and the generator,
a core engine operably disposed between the fan and the low pressure turbine,
a low pressure turbine shaft drivingly connected to the fan and the generator, and
variable inlet guide vanes disposed within the outer fan duct just upstream of the fan.

11. The high energy system as claimed in claim 10, further comprising:
inner and outer portions of the fan disposed in an annular inner fan duct and the outer fan duct respectively,
a rotating shroud separating inner and outer portions, and
the core engine downstream of the inner fan duct and the inner portion therein.

12. The high energy system as claimed in claim 11, further comprising variable outlet guide vanes disposed within the outer fan duct just downstream of the fan.

13. The high energy system as claimed in claim 11, further comprising a bypass duct extending axially and downstream from the outer fan duct and a surface heat exchanger disposed in the bypass duct.

14. The high energy system as claimed in claim 13, further comprising the surface heat exchanger operably connected to the generator for cooling the generator.

15. The high energy system as claimed in claim 11, further comprising a refrigeration apparatus operably disposed between the annular heat exchanger and the power consuming device for cooling the power consuming device.

16. The high energy system as claimed in claim 15, further comprising the refrigeration apparatus including a vapor cycle cooling system and a cold storage containing a phase change material.

17. The high energy system as claimed in claim 16, further comprising variable outlet guide vanes disposed within the outer fan duct just downstream of the fan.

18. A directed energy weapon system comprising:
a directed energy weapon,
a turbogenerator including a gas turbine engine operably connected a generator for powering the generator and the operably connected to the directed energy weapon for powering the directed energy weapon,
conditioning power electronics operably disposed between the generator and the directed energy weapon for conditioning the electricity produced by the electrical generator and supplied to the directed energy weapon,
a cooling system operably connected to the directed energy weapon and the conditioning power electronics for cooling the directed energy weapon and the conditioning power electronics,
the cooling system including an annular heat exchanger powered by a fan in the gas turbine engine,
variable inlet guide vanes disposed within the outer fan duct just upstream of the fan, and
the annular heat exchanger disposed entirely upstream of the variable inlet guide vanes and across an annular outer fan duct of the gas turbine engine.

19. A directed energy weapon system as claimed in claim 18, further comprising variable outlet guide vanes disposed within the outer fan duct just downstream of the fan.

20. The The directed energy weapon system as claimed in claim 18, further comprising:
the gas turbine engine including a low pressure turbine drivingly connected to the fan and the generator,
a core engine operably disposed between the fan and the low pressure turbine,
a low pressure turbine shaft drivingly connected to the fan and the generator, and
variable inlet guide vanes disposed within the outer fan duct just upstream of the fan.

21. The directed energy weapon system as claimed in claim 20, further comprising:
inner and outer portions of the fan disposed in an annular inner fan duct and the outer fan duct respectively,
a rotating shroud separating inner and outer portions, and
the core engine downstream of the inner fan duct and the inner portion therein.

22. The directed energy weapon system as claimed in claim 21, further comprising variable inlet guide vanes disposed within the outer fan duct just upstream of the fan.

23. The directed energy weapon system as claimed in claim 21, further comprising variable outlet guide vanes disposed within the outer fan duct just downstream of the fan.

24. The directed energy weapon system as claimed in claim 18, further comprising a refrigeration apparatus operably disposed between the annular heat exchanger and the directed energy weapon for cooling the directed energy weapon.

25. The directed energy weapon system as claimed in claim 24, further comprising the refrigeration apparatus including a vapor cycle cooling system and a cold storage containing a phase change material.

26. The directed energy weapon system as claimed in claim 25, further comprising a bypass duct extending axially and downstream from the outer fan duct and a surface heat exchanger disposed in the bypass duct and operably connected to the generator for cooling the generator.

27. The directed energy weapon system as claimed in claim 24, further comprising:
the gas turbine engine including a low pressure turbine drivingly connected to the fan and the generator,
a core engine operably disposed between the fan and the low pressure turbine,
a low pressure turbine shaft drivingly connected to the fan and the generator, and
variable inlet guide vanes disposed within the outer fan duct just upstream of the fan.

28. The directed energy weapon system as claimed in claim 27, further comprising:
inner and outer portions of the fan disposed in an annular inner fan duct and the outer fan duct respectively,
a rotating shroud separating inner and outer portions, and
the core engine downstream of the inner fan duct and the inner portion therein.

29. The directed energy weapon system as claimed in claim 28, further comprising variable outlet guide vanes disposed within the outer fan duct just downstream of the fan.

30. The directed energy weapon system as claimed in claim 28, further comprising a bypass duct extending axially and downstream from the outer fan duct and a surface heat exchanger disposed in the bypass duct and operably connected to the generator for cooling the generator.

31. The directed energy weapon system as claimed in claim 30, further comprising variable outlet guide vanes disposed within the outer fan duct just downstream of the fan.

* * * * *